United States Patent Office 2,699,371
Patented Jan. 11, 1955

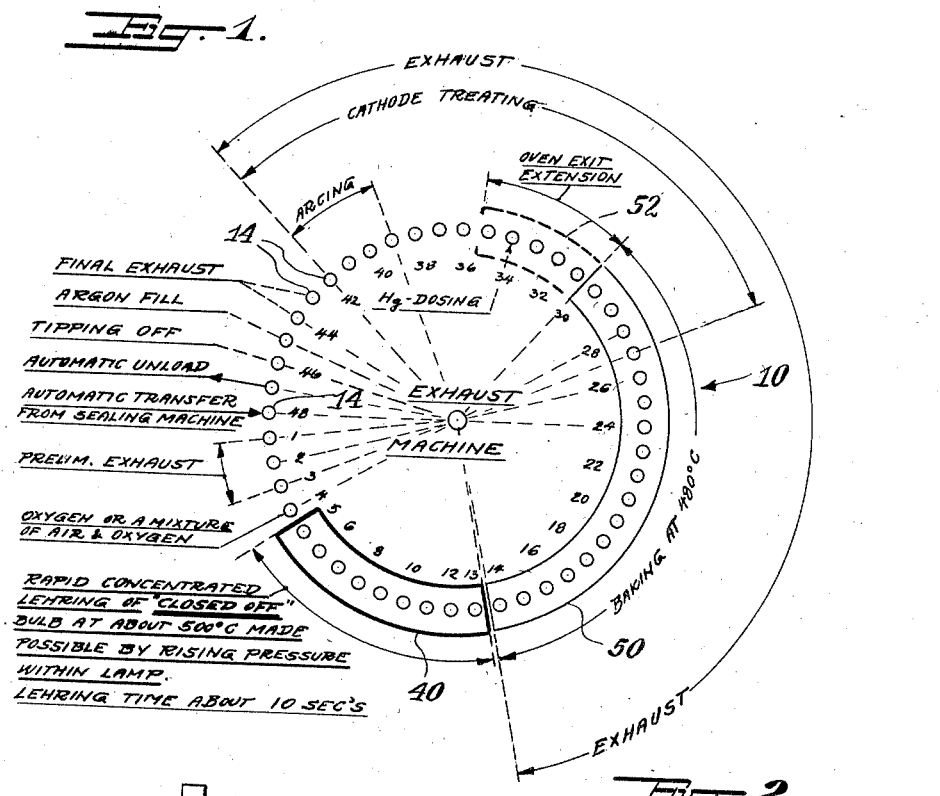
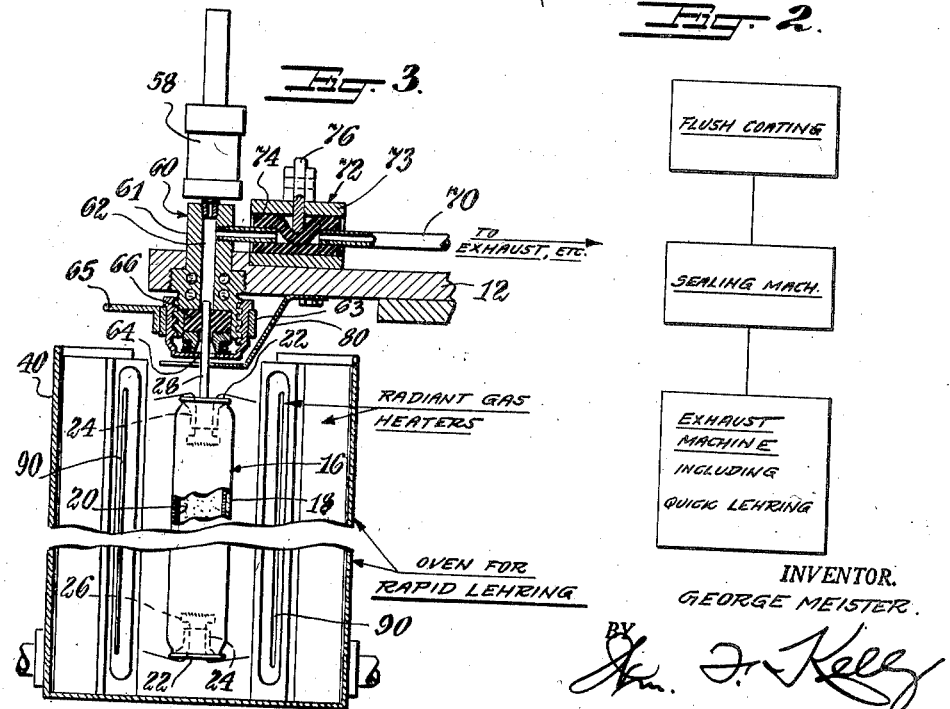

2,699,371

METHOD FOR SIMULTANEOUS LEHRING IN A CLOSED SYSTEM AND EXHAUSTING OF FLUORESCENT LAMPS

George Meister, Newark, N. J., assignor to Westinghouse Electric Corporation, East Pittsburgh, Pa., a corporation of Pennsylvania Application March 30, 1954, Serial No. 419,781

5 Claims. (Cl. 316—12)

The present invention relates to exhaust machines and, more particularly, to an improved method and apparatus for simultaneous lehring and exhausting fluorescent lamps.

In the manufacture of fluorescent lamps separate ovens in which glassware may be annealed or lehrs, have been employed to heat the phosphor coated tubular envelopes to an elevated temperature to remove the phosphor coating binder.

I am aware of U. S. Patent No. 2,449,637 issued to Harold D. Blake et al. on September 21, 1948, entitled "Method and Apparatus for Manufacturing Fluorescent Lamps" and assigned to General Electric Company. This patent teaches a method and apparatus for the heat treating or lehring of the phosphor coating on the tubular envelope during the exhaust of the fluorescent lamp or immediately prior thereto. Blake et al. employs an "open system" of lehring utilizing a gradual flow of air from the exhaust head to the lamp through one exhaust tubulation and a corresponding outward flow of air mixed with the deleterious gaseous products of lehring (i. e. products of the burning of the binder in the phosphor coating) through a second exhaust tubulation at the other end of the lamp. The flow of air of Blake et al. through the lamp during the lehring operation is sufficiently large to displace the volume therein three times. Blake et al. employs a lehring temperature range of 400 to 600° C. for a time interval between 10 and 1 minutes, preferring the lower temperature range with the longer period of treatment.

Hence, it has been found advantageous according to the invention to provide a "closed system" method and apparatus for simultaneously lehring and exhausting fluorescent lamps.

The method of the invention in its simpliest form comprises loading a sealed fluorescent lamp by means of its one tubulation, into a head of a modified automatic exhaust machine, filling the lamp with an oxidizing gas, such as air, at atmospheric pressure, closing off the lamp from the exhaust system of the machine, and raising the temperature of the air filled lamp as rapidly as possible in the order of about 10 seconds to a temperature of about 500° C. to decompose the binder of the phosphor coating on the interior of the lamp envelope. The decomposition of the binder must be done rapidly to avoid any residual carbonaceous material remaining in the lamp. Residual carbonaceous material causes poor lumen output and poor lumen maintenance.

After the lehring operation on the modified automatic exhaust machine, the lamp is connected to the vacuum system of the machine during the subsequent baking operation, cathode treating operation and lamp arcing operation.

The method and modified exhaust machine of the invention lehrs the sealed fluorescent lamp on a "closed system" utilizing the liberated gases from the binder, such as nitrogen dioxide, in addition to the oxidizing gas added to the system, to effectively complete the decomposition of the binder in a short heating period. By employing a "closed system" of lehring the increased pressure in the system enhances the oxidation effect of the oxidizing gas or gases. Heating is done rapidly i. e. in less than a minute to avoid carbon "brownish" residue forming in the phosphor coating on the fluorescent lamp envelope, thus eliminating a subsequent heating at a higher temperature to remove the carbon residue by oxidation. In addition, the rapid heating avoids excessive heating of the phosphor coating at an elevated temperature. In addition to air, oxygen or a mixture of oxygen with other gases may be employed for the lehring or decomposition of the phosphor coating binder. No circulation of air, or other flush gases, common to the "open system" of simultaneously lehring and exhausting is employed.

In its general aspect the present invention has as its objective a method and apparatus for simultaneously lehring and exhausting fluorescent lamps in a "closed system."

A specific object of the present invention is a method of simultaneously lehring and exhausting fluorescent lamps comprising lehring fluorescent lamps in a "closed system" by quickly raising the temperature of a lamp filled with an oxidizing gas to about 500° C. in less than a minute to oxidize liberated carbonaceous material from the phosphor coating binder, and then exhausting the fluorescent lamp.

A further object is a method of simultaneously lehring and exhausting fluorescent lamps on a "closed system" utilizing the liberated oxidizing gas of the phosphor coating binder decomposition in addition to the oxidizing gas employed.

A still further object is a "closed system" method of lehring which increases the pressure within the lamp during lehring and enhances the oxidation affect of the oxidizing gas or gases employed therein.

Another object is a method of simultaneously lehring and exhausting fluorescent lamps employing rapid heating during the lehring operation to avoid the formation of carbonaceous residue in the phosphor coating and prevent excessive heating of the phosphor for long periods of time at the oxidizing temperature.

An additional object is a method of simultaneously lehring and exhausting fluorescent lamps on a modified automatic exhaust machine which eliminates the use of circulating air or other flush gases.

Other objects of the present invention will become apparent to those skilled in the art to which it appertains as the description thereof proceeds both by direct recitation thereof and by implication from the context.

Referring now to the drawing in which like numerals of reference indicate similar parts throughout the several views:

Fig. 1 is a plan diagrammatical view of a modified automatic exhaust machine on which the improved simultaneously lehring and exhausting of fluorescent lamps of the invention may be practiced.

Fig. 2 is a flow chart illustrating the method of manufacture of fluorescent lamps incorporating the simultaneous lehring and exhausting method of the invention.

Fig. 3 is a side elevational view partially in section of a head of the modified automatic exhaust machine and a fluorescent lamp undergoing the "closed system" lehring in an oven at a lehring station of the modified automatic exhaust machine.

EXHAUST MACHINE

Referring now to Fig. 1, the reference numeral 10 indicates a modified automatic exhaust machine for fluorescent lamps wherein the invention is contained. This machine 10 may have a rotatable turret 12 for carrying a plurality of exhaust heads 14, for example 48 in the present showing of Fig. 3, which are indexable through a like number of work stations.

At station 48, a sealed fluorescent lamp 16 (Fig. 3) may be automatically transferred from a sealing machine (not shown) to a head 14 of the exhaust machine 10. The fluorescent lamp 16 may comprise a suitable tubular vitreous envelope 18, previously coated, by flush coating methods, with a suitable phosphor 20 and an electrode mount 22 sealed to each end of the coated envelope 18.

This envelope 18 may be made of a regular commercial type soft glass, for example either a soda lime glass such as Corning Code No. 0080 having a composition of about 72.85% ($SiO_2$), 16.45% $Na_2O$, .59% $K_2O$, 4.98% CaO, 3.50% MgO, 1.23% $R_2O_3$ (iron and alumina) 1.4% $As_2O_3$; or a lead (or potash soda) glass such as Corning Code No. 0120 having a composition of about 56.51% $SiO_2$, 4.03% $Na_2O$, 8.25% $K_2O$, 29.67% PbO, 1.35% $R_2O$ (iron and alumina). The soda lime glass softens at about 696° C. and the lead glass softens at about 630° C.

Each of the electrode mounts 22 may consist of a suitable stem 24 on which may be mounted a cathode electrode 26 handily coated with an emissive material, such as an alkaline earth carbonate. It will be understood that only one of the electrode mounts 22 is provided with an exhaust tubulation 28 for securement of the lamp 16 in a head 14 and the evacuating of the lamp 16 therethrough during the exhaust of the lamp 16.

The lamp 16 may be preliminarily evacuated at stations "1," "2" and "3." At station "4" the oxidizing gas, for example either oxygen, a mixture of air and oxygen, or air itself may be admitted to the lamp 16. It will be understood that from stations "5" through "13" the filled lamp 16 is closed off from the evacuating system of the machine 10, and rapidly lehred in a closed system at about 500° C. for a period of less than one minute in a lehring oven 40 (Fig. 3). It will be understood that from stations "14" through "30" that the lehred lamp 16 (Fig. 1) is no longer closed off from the evacuating system of the machine 10 and is under vacuum or exhaust.

From stations "14" through "30" the lehred lamp 16 may be baked at a temperature of about 480° C. in an oven 50 (Fig. 1). From stations "30" through "35" the oven 50 may be provided with an extension 52 to minimize heat loss from the oven 50 and to maintain an adequate bulb temperature at the mercury dosing station, for example station "34," for dosing by a suitable mercury doser 58 (Fig. 3). It will be understood that the lehring oven 40, the baking oven 50 and the extension 52 will be maintained at a uniform temperature from top to bottom to obtain a desirable (for example approximately 400° C.) minimum bulb temperature at the oven exit, at station "35."

From station "27," for example, through station "42" the lamp cathodes 26 both simultaneously undergo suitable treatment. The treatment of both cathodes 26 simultaneously may be accomplished through opposite track contacts (not shown) positioned near the top and bottom of the lamp. Indicator lamps (not shown) may be employed at all cathode treating stations which are located in the oven, so that the machine attendant and operator may visually inspect the cathode treating.

At stations "39" through "42" a high voltage may be applied across the lamp 16 and an arc formed with the aid, for example, of a pair of spark coils juxtaposed along the lamp length. The high voltage may be applied to one leg of each cathode 26 on the first two arcing positions and to the opposite leg of each cathode 26 on the last two arcing positions. The lamp 16 may undergo a final exhaust at stations "43" and "44." A suitable filling of an inert gas, for example argon, at a pressure of 3.6 to 4.0 mm. of mercury may be admitted to the exhausted lamp 16 at station "45." At station "46" the lamp 16 may be automatically tipped off and unloaded from the modified exhaust machine 10 at station "47."

HEAD

As shown in Fig. 3 each of the heads 14 has a conventional compression rubber assembly 60 which may be threadably secured to the turret 12 by means of a hollow body or housing 61. This body is provided with an axial hole 62 therethrough and having a lower compression rubber receiving portion of larger diameter than the upper portion thereof.

A hollow cap 63 provided with an exhaust tubulation guide hole 64 and carrying a suitable operating handle 65, threadably engages the outer periphery of the bottom portion of the body 61 which depends below the turret 12. A compression rubber or washer 66 is seated on a hollow ball bearing insert in the lower portion of the hole 62 of the body 61 and retained therein by the cap 63. As shown in Fig. 3 the hole 64 in the cap 63 is aligned with the hollow portion of the insert and the washer 66 and the hole 62 in the body 61. The one exhaust tubulation 28 of a lamp 16 may be inserted through the cap 63, the insert and the rubber 66 and secured thereat by the rotation of the handle 65, thus compressing the rubber 66 about the upper end of the tubulation 28.

The mercury doser 58 of conventional design may be mounted by means of a threaded connection on the upper end of the hole 62 of the body 61 of the compression rubber assembly 60. A horizontal line 70 connects the hole 62 in the body 61 to the movable portion (not shown) of an exhaust valve (not shown) of the modified exhaust machine 10. A hand operated valve 72 (normally closed at stations "5" through "13") may be provided in the line 70.

This valve 72 may comprise a suitable housing 73 containing therewithin a rubber tubing 74, adapted to be closed upon movement of a camming pinch clamp or bell crank lever 76. The lever 76 is actuated either manually or automatically, as by engagement with an operating arm (not shown). An exhaust tubulation and head baffle 80 carried on the underside of the turret 12 may be employed to guide a tubulation 28 into the guide hole 64 in the cap 63, to prevent overheating of the compression rubber assembly 60 and to eliminate undue heat loss from the lehring oven 40.

LEHRING OVEN

This lehring oven 40, generally U-shaped in vertical cross section and suitably open at the top to permit passage of the lamps 16 therethrough, is provided with a plurality of oppositely disposed radiant heaters or gas burners 90 which are capable of uniformly and rapidly heating the lamps 16, (filled with a suitable oxidizing gas at atmospheric pressure) to about 500° C. in approximately 10 seconds. The burners 90 are capable of maintaining the lamps 16 (undergoing lehring) at this temperature from stations "7" through "13."

If, for example, a production of 800 exhausted fluorescent lamps per hour is expected, the index time from station to station of the machine 10 would be 3600 seconds divided by 800 or about 4.5 seconds. Assuming that a lamp 16 remains in the lehring oven 40 from station "5" through station "13" (i. e. for 9 stations) a lamp 16 is subjected to a total lehring time of approximately 4.5 seconds times 9 or a total of 40.5 seconds. Allowing approximately 10 seconds or two stations (stations "5" and "6") for the lamp to be raised to the lehring temperature of about 500° C., this leaves a residual lehring time (at about 500° C.) of approximately 30.5 seconds.

It will be understood that the pressure of the oxidizing gas within the lamp (undergoing lehring at about 500° C. within the oven 40 in a "closed system") rises considerably during lehring, thus enhancing the oxidizing effect of the oxidizing gas or gases employed therein. It will be further understood that at the lehring temperature the oxidizing gas is enriched by other oxidizing gases (such as nitrogen dioxide) evolved from the decomposition of the phosphor coating binder. These additional gases act as an additional oxidizing agent to thoroughly oxidize or burn off any liberated or formed carbonaceous material released from the binder.

Use of the "closed system" lehring permitting increased pressure of the oxidizing gas during lehring and the use of additional oxidizing gases of the decomposition of the binder coupled with the extremely rapid rise of a lamp 16 from room temperature to lehring temperature (i. e. about 10 seconds) prevents collection of undesirable intermediate decomposition products from the binder in the exhaust tubulation 28 and eliminates excessive heating of the phosphor coating 20 at the lehring temperature.

TEST RESULTS

A group of 20 watt fluorescent lamps 16 were flush coated with the regular 3500° K. white phosphor, for example a blend of zinc beryllium silicate with magnesium tungstate. White calcium halophosphate phosphor may also be used. Some of the lamps 16 were simultaneously lehred and exhausted in a "closed system" on a modified exhaust machine 10 of the invention. Others in the test group were given the conventional lehring in a separate lehr (not shown) and exhausted on a conventional exhaust machine (not shown).

The following test data includes the lumen efficiency and color readings for the first 600 hours of life of the test lamps:

*Comparison data on 3500° white fluorescent lamps coated with 3500° white (blend of zinc beryllium silicate with magnesium tungstate)*

| Lamp with Oxidizing Gas and fill pressure | L. P. W. | | | Color | | |
|---|---|---|---|---|---|---|
| | 0 Hrs. | 100 Hrs. | 600 Hrs. | 0 Hrs. | 100 Hrs. | 600 Hrs. |
| $16_1$—$O_2$—750 mm | 44.6 | 35.2 | 33.9 | {0.415 / 0.396} | 0.412 / 0.398 | 0.413 / 0.400 |
| $16_2$—$O_2$—755 mm | 43.1 | 35.7 | 33.0 | {0.419 / 0.399} | 0.420 / 0.401 | 0.421 / 0.406 |
| $16_3$—$O_2$—450 mm | 41.8 | 36.5 | 35.7 | {0.419 / 0.399} | 0.419 / 0.399 | 0.423 / 0.404 |
| $16_5$—Air—740 mm | 44.7 | 36.0 | 33.5 | {0.416 / 0.399} | 0.411 / 0.398 | 0.415 / 0.400 |
| $16_1'$—Previously lehred | 41.1 | 35.3 | 32.2 | {0.417 / 0.399} | 0.415 / 0.403 | 0.423 / 0.404 |
| $16_2'$—Previously lehred | 44.3 | 36.3 | 31.4 | {0.417 / 0.400} | 0.419 / 0.401 | 0.421 / 0.404 |

Phosphors are commonly designated in the art by the color temperature of the radiation of the lamps into which they are incorporated. In this respect reference is made by the Handbook of Colorimetry by Arthur C. Hardy, page 15, published by the Technology Press, Massachusetts Institute of Technology, Cambridge, Mass. (1936). As therein indicated, "the chromaticity of the radiation from a black body at various temperatures may be indicated on an I. C. I., Diagram, the "*x*" and "*y*" coordinates of points plotted thereon being given in the above data. It is possible to obtain radiation which is not describable by Planck's law that will nevertheless have the same chromaticity as a black body at the same temperature. This temperature is called the color temperature of the radiation, i. e. in this case a 3500° K. white phosphor. The lamps 16 which incorporate this zinc beryllium blend phosphor will radiate at a color which has the same chromaticity as a black body at the designated temperature (i. e. 3500° K.) within, of course, the commercially acceptable color limits.

The above data shows that after 100 hours of life the lamps 16, simultaneously lehred in a "closed system" and exhausted, are comparable in lumen efficiency to the separately lehred lamps 16'. However, after 600 hrs. the lumen efficiency of those of the simultaneously lehred and exhausted lamps is superior to the separately lehred lamps 16'. The color drift for both groups of lamps is about the same.

Although a preferred embodiment of the invention has been disclosed it will be understood that modifications may be made within the spirit and scope of the invention.

I claim:

1. The method of simultaneously lehring in a closed system and exhausting a sealed fluorescent lamp having a phosphor coating on the envelope and open to the atmosphere comprising, heating said lamp in a closed system rapidly within about 10 seconds to about 500° C. lehring said heated lamp for less than one minute to oxidize the carbonaceous products from the decomposition of the binder of said phosphor coating, and immediately exhausting said lamp.

2. The method of simultaneously lehring in a closed system and exhausting a sealed fluorescent lamp having a phosphor coating on the envelope comprising evacuating said lamp, filling said lamp with an oxidizing gas, heating said filled lamp in a closed system rapidly within about 10 seconds to about 500° C., lehring said heated lamp for less than one minute to oxidize the carbonaceous products from the decomposition of the binder of said phosphor coating, and immediately exhausting said lamp.

3. The method of simultaneously lehring in a closed system and exhausting a sealed fluorescent lamp having a phosphor coating on the envelope comprising evacuating said lamp, filling said lamp with oxygen, heating said filled lamp in a closed system rapidly within about 10 seconds to about 500° C., lehring said heated lamp for less than one minute to oxidize the carbonaceous products from the decomposition of the binder of said phosphor coating, and immediately exhausting said lamp.

4. The method of simultaneously lehring in a closed system and exhausting a sealed fluorescent lamp having a phosphor coating on the envelope comprising evacuating said lamp, filling said lamp with air, heating said filled lamp in a closed system rapidly within about 10 seconds to about 500° C., lehring said heated lamp for less than one minute to oxidize the carbonaceous products from the decomposition of the binder of said phosphor coating, and immediately exhausting said lamp.

5. The method of simultaneously lehring in a closed system and exhausting a sealed fluorescent lamp having a phosphor coating on the envelope comprising evacuating said lamp, filling said lamp with a mixture of air and oxygen, heating said filled lamp in a closed system rapidly within about 10 seconds to about 500° C. lehring said heated lamp for less than one minute to oxidize the carbonaceous products from the decomposition of the binder of said phosphor coating, and immediately exhausting said lamp.

No references cited.